(12) United States Patent
Myra

(10) Patent No.: US 11,412,890 B2
(45) Date of Patent: Aug. 16, 2022

(54) SYSTEM, METHOD, AND DEVICE FOR PROVIDING A CUTTING BOARD FOR A PELLET GRILL HOPPER LID

(71) Applicant: Jeffrey E. Myra, Hardwick, MA (US)

(72) Inventor: Jeffrey E. Myra, Hardwick, MA (US)

( * ) Notice: Subject to any disclaimer, the term of this patent is extended or adjusted under 35 U.S.C. 154(b) by 0 days.

(21) Appl. No.: 17/443,620

(22) Filed: Jul. 27, 2021

(65) Prior Publication Data

US 2022/0142407 A1 May 12, 2022

Related U.S. Application Data

(60) Provisional application No. 63/198,777, filed on Nov. 12, 2020.

(51) Int. Cl.
*A47J 47/00* (2006.01)
*A47J 37/07* (2006.01)

(52) U.S. Cl.
CPC ......... *A47J 37/0786* (2013.01); *A47J 47/005* (2013.01)

(58) Field of Classification Search
CPC ............................ A47J 37/0786; A47J 47/005
See application file for complete search history.

(56) References Cited

U.S. PATENT DOCUMENTS

| | | |
|---|---|---|
| 3,391,682 A | 7/1968 | King et al. |
| 5,341,793 A | 8/1994 | Brown |
| 6,000,389 A | 12/1999 | Alpert |
| 6,142,140 A | 11/2000 | Shumaker |
| 6,666,343 B1 | 12/2003 | Liu |
| 7,168,363 B1 | 1/2007 | Brown |
| 2004/0084571 A1 | 5/2004 | Liu |
| 2008/0245357 A1 | 10/2008 | Meether et al. |
| 2015/0123331 A1* | 5/2015 | Difante ................ A47J 47/005 269/9 |
| 2015/0136113 A1 | 5/2015 | Polter et al. |
| 2017/0164783 A1 | 6/2017 | Sauerwein et al. |
| 2018/0140141 A1* | 5/2018 | Russell ................ A47J 47/005 |
| 2018/0296031 A1 | 10/2018 | Terrell, Jr. et al. |
| 2018/0325314 A1 | 11/2018 | Walters |
| 2019/0160849 A1* | 5/2019 | Kain .................... G04B 37/144 |
| 2020/0046163 A1 | 2/2020 | Yang et al. |
| 2020/0093145 A1 | 3/2020 | Powell et al. |
| 2020/0113382 A1 | 4/2020 | Ahmed et al. |
| 2020/0187720 A1* | 6/2020 | Kilcher ................ A47J 47/16 |
| 2020/0240643 A1 | 7/2020 | Donnelly et al. |

* cited by examiner

*Primary Examiner* — Nirvana Deonauth
(74) *Attorney, Agent, or Firm* — Dunlap Bennett & Ludwig, PLLC

(57) ABSTRACT

A cutting board for a hopper of a pellet grill, wherein the cutting board has a recessed area for removably attaching to the lid of the hopper. The cutting board may include magnetizable material countersunk to the recess area for magnetically attaching to the lid of the hopper. The cutting board may provide instructional indicia along the edges of the recessed area, wherein the instructional indicia is visible when the hopper lid is in an open condition.

2 Claims, 5 Drawing Sheets

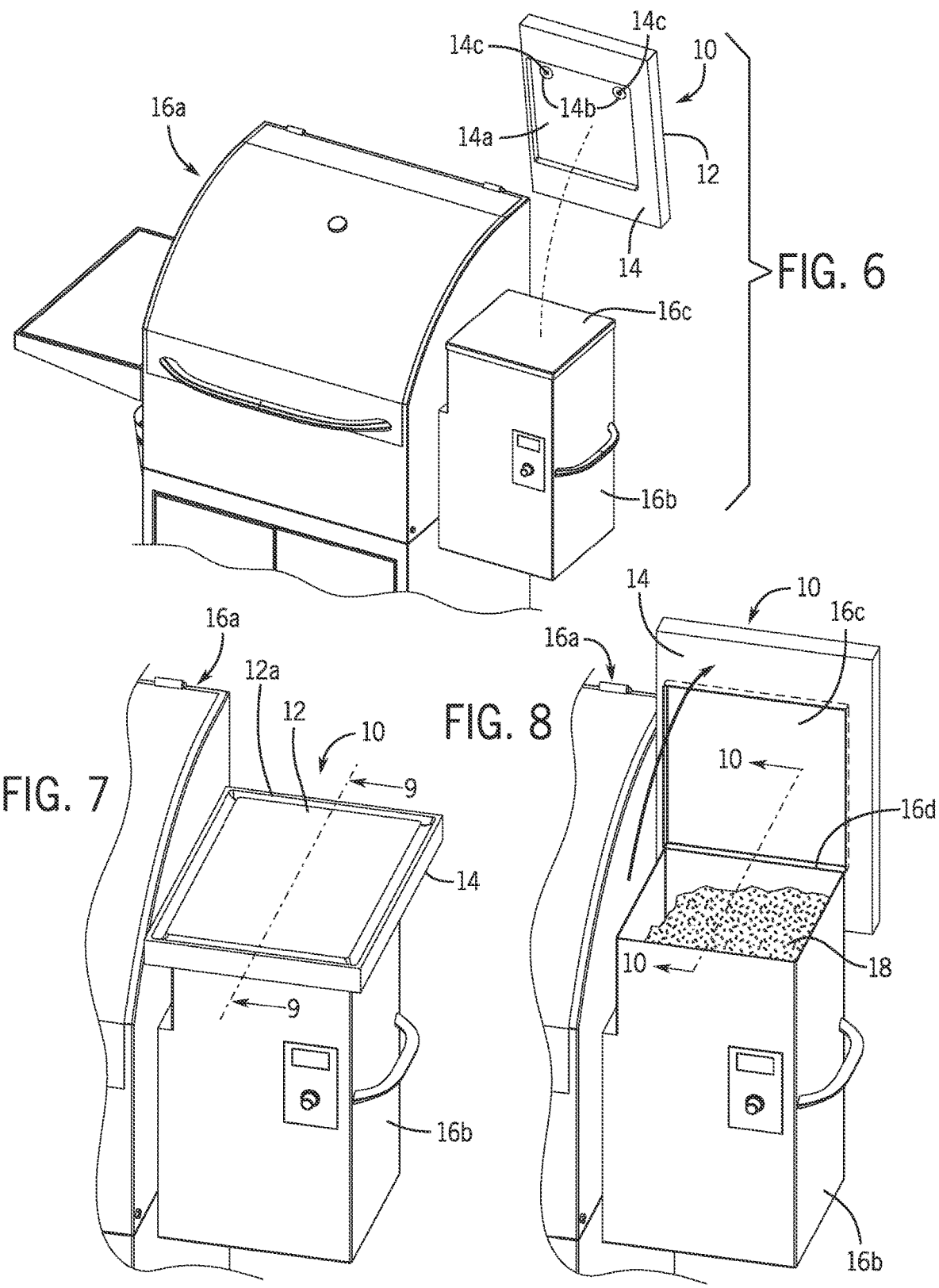

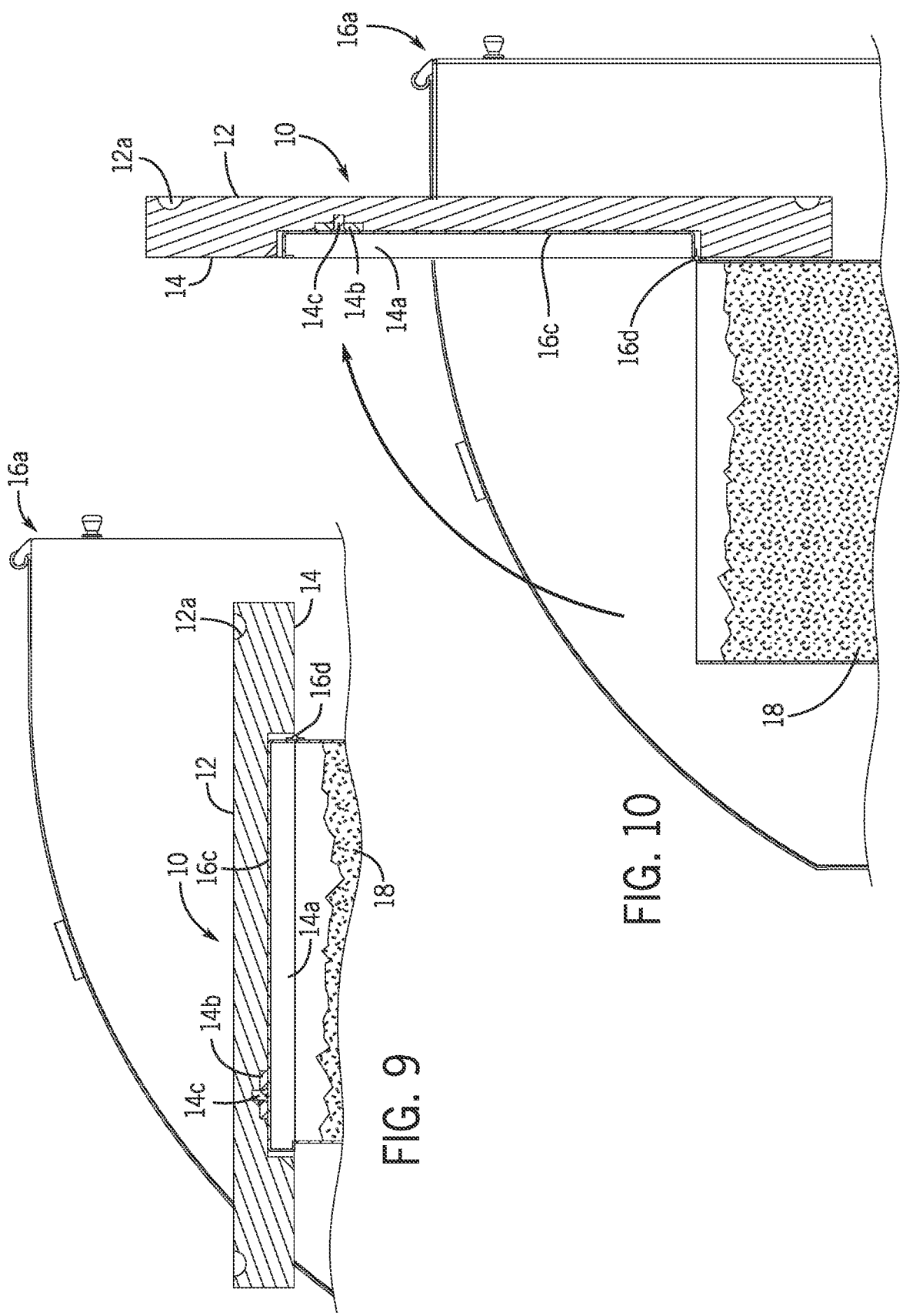

SYSTEM, METHOD, AND DEVICE FOR PROVIDING A CUTTING BOARD FOR A PELLET GRILL HOPPER LID

CROSS-REFERENCE TO RELATED APPLICATION

This application claims the benefit of priority of U.S. Provisional Application No. 63/198,777 Nov. 12, 2020, the contents of which are herein incorporated by reference.

BACKGROUND OF THE INVENTION

The present invention relates to cooking equipment, and more particularly, to a system, method, and device for providing a cutting board for a pellet grill hopper lid. The cutting board has a recess with magnets, wherein the recess fits over the pellet grill hopper lid.

Pellet grills are outdoor cookers fueled by wood pellets, which can be automatically fed from a hopper to the grill's fire for maintaining a consistent cooking temperature. The hopper is where the pellets are stored. The hopper is typically side mounted to the pellet grill. These pellet hoppers have pivotably attached top lids for easy replenishment of the stored pellets.

Currently available hopper lids are small, not flat, and/or are sometimes dirty. Users of pellet grills are therefore unable to benefit from the horizontal space of the hopper lid that could otherwise be used while grilling. And there are few alternative spots for securely placing a cutting board, which tend slide around on top of the grill shelf or grill hoppers. This is not only inconvenient but also unsafe.

As can be seen, there is a need for a solution to these problems. A particular need exists for a way to use the horizontal space of the hopper lid and provide a securely attached cutting board for accommodating grilling items (i.e., meat, grill tools or other necessary items for grilling).

BRIEF DESCRIPTION OF THE DRAWINGS

FIG. 6 is an exploded perspective view of an exemplary embodiment of the present invention, shown in use with a grill and pellet hopper.

FIG. 7 is a detailed perspective view of an exemplary embodiment of the present invention, shown in use with the pellet hopper.

FIG. 8 is a perspective view of an exemplary embodiment of the present invention, illustrating the hopper lid moving to an open condition while operatively associated with the cutting board.

FIG. 9 is a cross-section view of an exemplary embodiment of the present invention, taken on line 9-9 of FIG. 7 showing the cutting board in a closed position.

FIG. 10 is a cross-section view of an exemplary embodiment of the present invention, taken on line 10-10 of FIG. 8, showing the cutting board in the open position.

SUMMARY OF THE INVENTION

Figure 1:
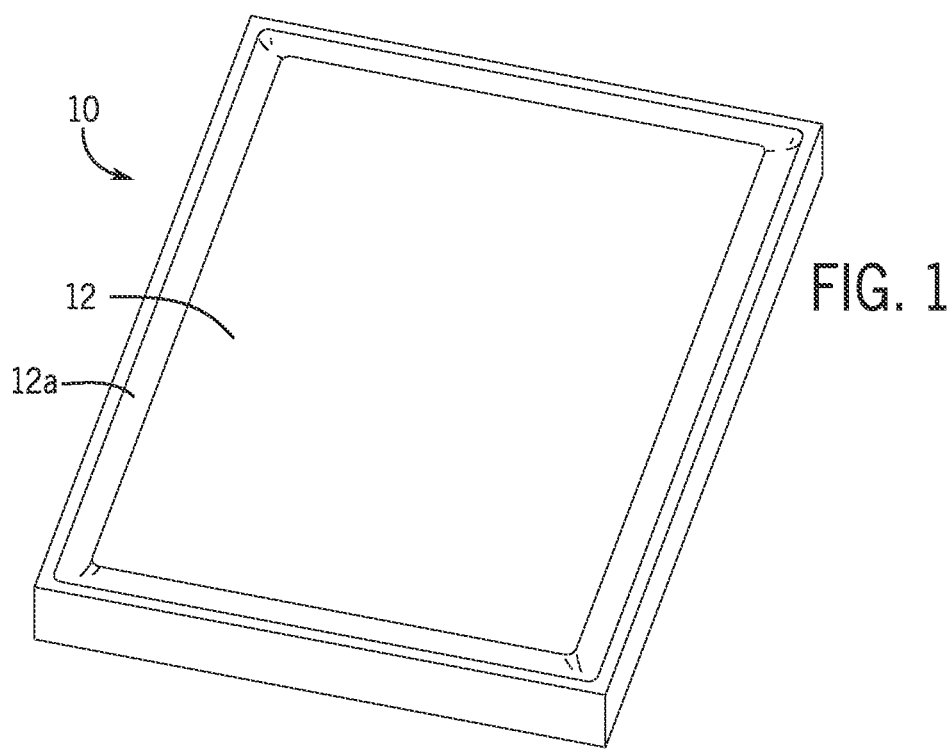
FIG. 1 is a top perspective view of an exemplary embodiment of the present invention.
Figure 2:
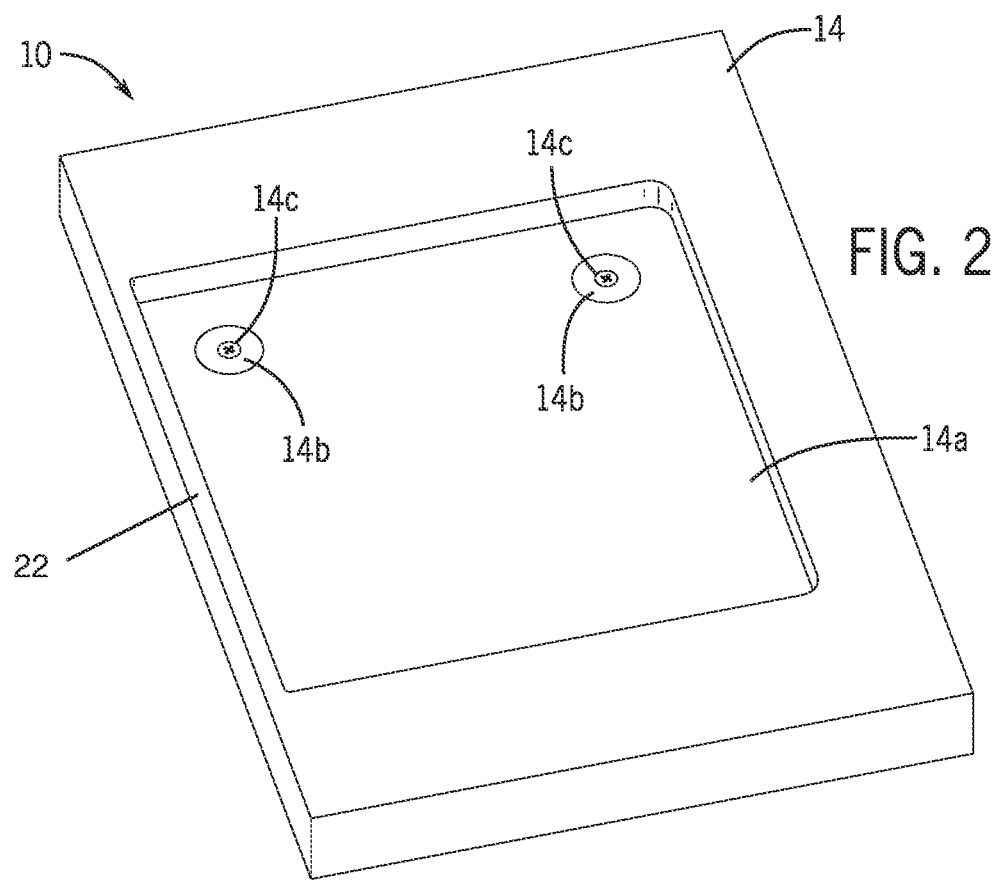
FIG. 2 is a bottom perspective view of an exemplary embodiment of the present invention.
Figure 4:
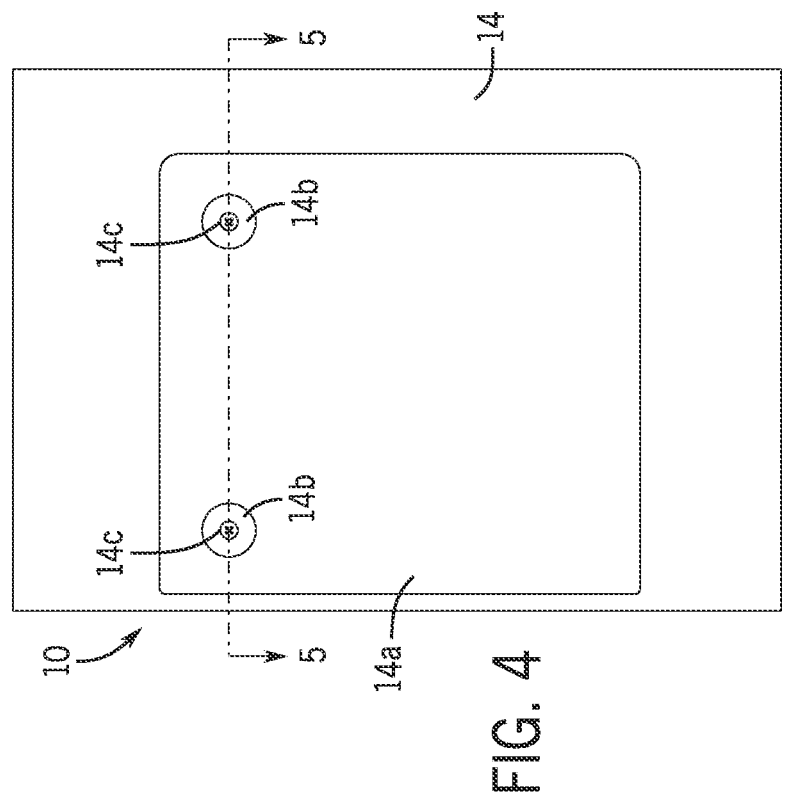
FIG. 4 is a bottom plan view of an exemplary embodiment of the present invention.
Figure 3:
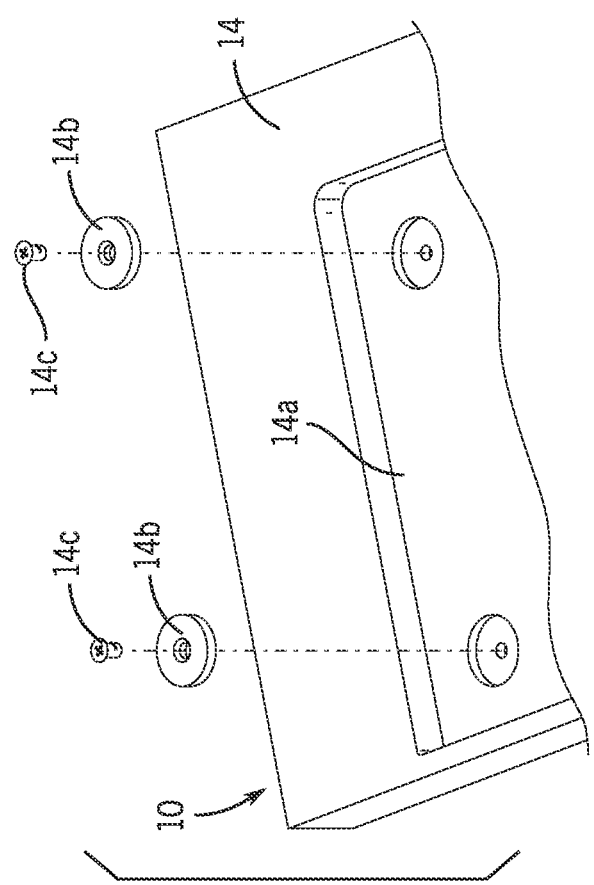
FIG. 3 is a detailed exploded bottom perspective view of an exemplary embodiment of the present invention.
Figure 5:
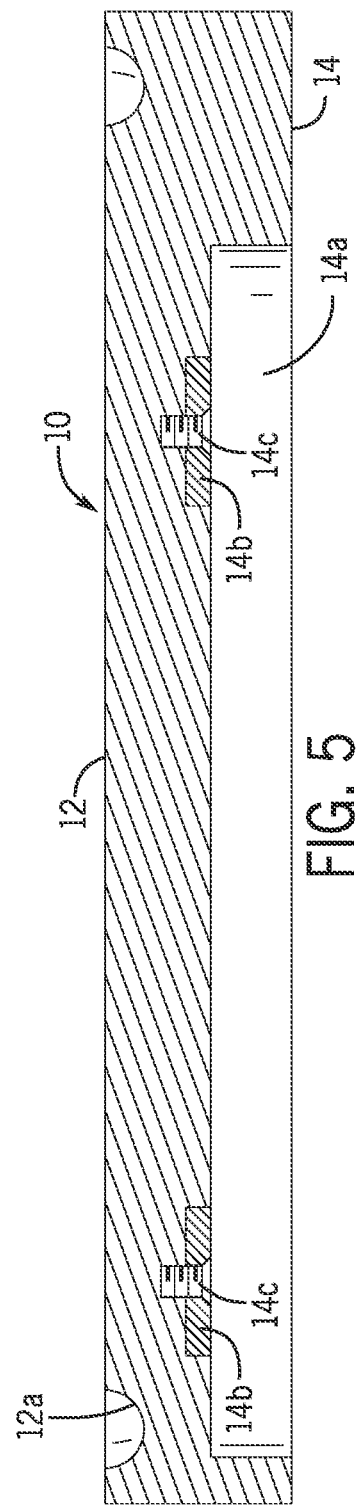
FIG. 5 is a cross-section view of an exemplary embodiment of the present invention, taken along line 5-5 of FIG. 4.
Figure 11:
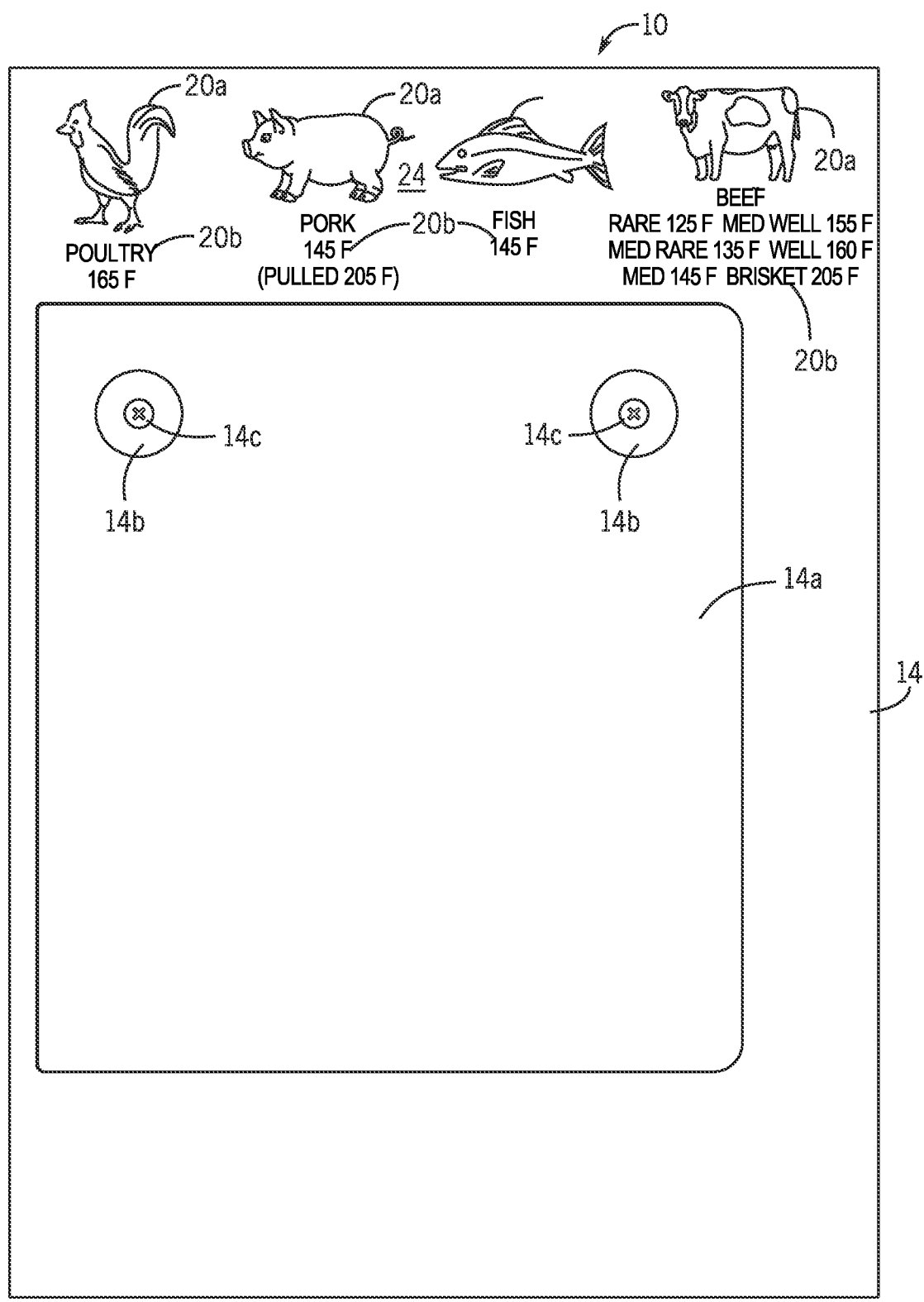
FIG. 11 is a bottom plan view of an exemplary embodiment of the present invention, illustrating instructional indicia along a bottom surface of the cutting board so that when the hopper lid is in the open condition, the instructional indicia is visible.

In one aspect, the present invention may include an apparatus for a grill hopper, the apparatus includes a board having a bottom surface; and a recessed area formed along the bottom surface, wherein the recessed area is dimensioned to receive a top lid of the grill hopper.

In another aspect the present invention provides the apparatus for a grill hopper having the following: a recessed distance between the bottom surface and the recessed area, wherein the recessed distance is between one-half to one and one-quarter of an inch; one or more attachment element along the recessed area, wherein the one or more attachment element is a magnetizable material, wherein the magnetizable material is a neodymium magnet, wherein the neodymium magnet is countersunk in the recessed area, wherein the recessed area defines an adjacent bottom edge having an adjacency width less than a width of the other edges, wherein each edge is defined by the two perimeters of the recessed area and the bottom surface, wherein the adjacency width is dimensioned to be received between a hopper lid and a grill that a hopper of the hopper lid is operatively associated with; and further including one or more instructional indicia provided along one of the other bottom edges; and a peripheral gutter along a top surface.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the present invention.

Broadly, an embodiment of the present invention provides system, method and device for providing a removable cutting board for a grill hopper lid. The cutting board is capable of being removed and securely mounted on the lid of a grill hopper for use. It is reusable, and easily removable for use on other surfaces and for cleaning. In an exemplary embodiment the cutting board may comprise a recessed area and a mounting means for secure, removable attachment to a grill. The cutting board may be securely removably mounted on the lid of a pellet hopper by any suitable mounting means. In an exemplary embodiment of the present invention the cutting board may include a mounting means which comprises magnets. The cutting board of the present invention may be constructed and arranged to securely and removably fit over a pellet grill hopper lid. The cutting board of the present invention may also fit over a grill side shelf.

The cutting board of the present invention provides a removable device which solves many problems associated with existing pellet grills. In one aspect the present invention solves the problems of hopper lids being too small or too dirty to use the horizontal space of the hopper lid. The cutting board of the present invention may allow the user to benefit from the horizontal space of the pellet grill hopper lid surface so that the space may be used while grilling. While typical cutting boards will slide around on top of the grill shelf or grill hoppers, the cutting board of the present invention may provide a cutting board that is securely mounted, yet removable. The cutting board may comprise a recessed area and strong magnets and may be constructed and arranged to be held securely to the grill hopper lid or a grill side shelf.

The claimed invention differs from and distinguishes over what currently exists. The removable cutting board of the present invention may provide the user more space to work from, and a clean working space. The cutting board may be taken off and cleaned in a sink. The cutting board of the present invention provides an unprecedented improvement over existing typical cutting boards because it has a recessed area with magnets to hold the cutting board in place. The flat bottoms of previous cutting boards do not allow them to be locked into place. One embodiment of the cutting board may comprise a recessed area and strong magnets to hold it securely to the grill hopper lid or side shelf.

As used herein, "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the present invention as oriented in FIG. 1. Furthermore, as there is no intention to be bound by any express or implied theory presented in the preceding technical field, background, brief summary or the following detailed description, it is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. As used in this application, the term "about" or "approximately" refers to a range of values within plus or minus 10% of the specified number.

List of parts of the present invention referred to in the appended FIGS. include the following:
- 10: is the overall custom cutting board with bottom recess area having recessed magnets therein fitted over.
- 12: is the top of the board.
- 12a: is the peripheral gutter.
- 14: is the bottom of the board.
- 14a: is the recess.
- 14b: are the magnets.
- 14c: are the fasteners.
- 16a: is the grill.
- 16b: is the hopper.
- 16c: is the lid.
- 16d: is the hinge.
- 18: are the pellets.
- 20a: are instructional imagine indicia.
- 20b: are instructional textual indicia.

Referring now to FIGS. 1 through 11, incorporated herein by reference in their entirety, illustrate exemplary embodiments of a removable cutting board system and method of the present invention, thereby providing a user with a clean working space adjacent to a pellet grill. The cutting board may be taken off and cleaned subsequent use.

Referring now to FIGS. 1 through 11, in an exemplary embodiment the present invention embodies a cutting board 10 adapted to removably secure to a pellet hopper 16b for operatively associating with a pellet grill 16a. The cutting board 10 has a top surface 12 for cutting which may have a peripheral gutter 12a just inward of the edge of the top surface 12. The cutting board may provide a bottom surface 14, wherein the bottom surface 14 provides a recessed area 14a. The recessed area 14a may provide one or more magnetizable element 14b countersunk along the recessed area 14a. Each magnetizable element 14b may be secured by a fastener 14c. An indicia area may be provided between the perimeter of the bottom surface 14 and the perimeter of the recessed area 14a, wherein the indicia area may comprise instructional imagine indicia 20a and instructional textual indicia 20b.

The cutting board 10 may comprise components made of any suitable materials having any suitable dimensions for functioning as disclosed herein. The cutting board 10 may be fabricated by any suitable fabrication method (for instance, the cutting body may be a unitary construction or comprise multiple boards that are affixed together by any suitable means). Nonlimiting examples of suitable materials include any wood, plastic, composite or other material. In an exemplary embodiment, the board may be made of maple wood. The board may be any geometric shape with any suitable dimensions. In an exemplary embodiment, the board may be 1 and ½ inch thick maple board and may be rectangular with dimensions of twelve inches by seventeen inches.

The magnetizable element 14b may be just one of many possible securement means. The securement means may comprise any suitable securement means capable of removably securing the cutting board to the pellet hopper 16b or its lid 16c. The securement means may comprise at least one suitable magnet 14b mounted in a recessed area 14a of the cutting board 10. The at least one magnet 14 may be any suitable magnet having any suitable shape and dimensions. The securement means may comprise a plurality of magnets. In an exemplary embodiment, the magnets may be two 1.26 inch by 0.2-inch Black Epoxy Coated Neodymium Disc Countersunk Hole Magnets.

In an exemplary embodiment, the components of the present invention may interrelate in the following manner: the hard maple board which includes a recess area 14a cut into the bottom to help hold it in place; and the strong magnets 14b which get screwed into a pocket in the recessed area under the board to securely hold the board to the metal pellet hopper lid 16c.

In an exemplary embodiment the present invention may be used in the following manner. The cutting board 10 may be placed onto the hopper lid by sliding it into the recessed area 14a allowing the magnets 14b to take hold of the lid and keep it secured.

The present invention may be fabricated by a process including one or more of the following steps and combinations thereof. Maple lumber may be provided and cut into 1 and ⅝$^{th}$ inch wide strips. The maple strips may then be glued together face to face to create a rough sized board. The board may then be planed and sanded to 1 and ½ inch thickness and dimensioned to a final size of twelve inches by seventeen inches. The bottom recess may be cut into the board to fit a specific pellet grill hopper lid. The board recess is sanded and two coats of catalyzed lacquer may then be applied to the bottom of the board. Each board may be custom to any grill. Once the recess area 14a is cut, one or more magnet countersink can be cut into the bottom of the recess area 14a. The magnets 14b may be installed using one fasteners 14c in each. The cutting board 10 may then be placed face up on a CNC machine, and a juice groove/peripheral gutter 12a may be applied to the top. The cutting board 10 may then be next sprayed with water to raise the grain before sanding. One more final fine sanding may take place and the top may be oiled with a food safe mineral oil and later coated with a wood butter made of bee's wax and other oils to help hydrate the board. Next the cutting boards 10 may be laser engraved to receive an internal temperature chart and company logo thereon.

In some embodiments, the magnets 14b may be placed inside the wood rather than being exposed. This would require a new step prior to and during the glue up process.

In an exemplary embodiment, the cutting board of the present invention may be used in the following manner. A person would identify the recessed area 14a along the bottom surface 14 of the cutting board 10 and slide it over the top of their hopper lid 16c. The cutting board 10 may be constructed and arranged to be dropped onto the lid and be secured magnetically.

The cutting board of the present invention may also be used as a typical kitchen cutting board because the board is flat on the bottom.

In summary in an exemplary embodiment, the present invention comprises a removable cutting board 10 with a magnetic attachment, which is capable of fitting over a pellet grill hopper lid 16c. The cutting board may comprise a recessed area and strong magnets to hold it securely to a grill hopper lid or a grill side shelf.

For clarity, only those aspects of the system germane to the invention are described, and product details well known in the art are omitted. In addition, many embodiments of the present invention have application to a wide range of industries. To the extent the present application discloses a system, the method implemented by that system is within the scope of the present invention. Further, to the extent the present application discloses a method, a system of apparatuses configured to implement the method are within the scope of the present invention.

The recessed area 14a may be dimensioned along the bottom surface 14 so that the adjacency edge 22, the edge between the hopper lid 16c and the grill 16a, is dimensioned to fit between the distance afforded between the hopper lid 16c and the grill 16a. The adjacency edge 22 may typically substantially thinner than the other perimetral edges. One of the other perimetral edges may define the indicia area 24 providing, in some embodiments, the instructional imagine indicia 20a and instructional textual indicia 20b.

The indicia area 24 may be disposed systematically, in that when the cutting board 10 is operatively associated with the hopper lid 16c and the hopper lid is pivoted to an open condition the instructional imagine indicia 20a and instructional textual indicia 20b are visible. Thus, though the pivotable attachment 16d for the hopper lid 16c is for moving the latter between a closed and the open condition (e.g., to add more pellets 18 therein), the hopper lid 16c may also be opened to the open condition during the use of the grill 16a so that the user may read the instructional indicia 20a and 20b to be advised on how to proceed in their cooking process, as the instructional imagine indicia 20a and instructional textual indicia 20b may include temperature charts or other cooking-related instructions.

Some of the pellet grill hopper lids that the present invention operatively associates with may open to the side, which does not allow the user to open the hopper while the cutting board 10 is in place; though, obviously the cutting board 10 can be easily taken off to check the pellets or to see the temperature chart/indicia area 24.

It should be understood, of course, that the foregoing relates to exemplary embodiments of the invention and that modifications, variations and changes in detail may be made without departing from the spirit and scope of the invention as set forth in the following claims.

What is claimed is:

1. An apparatus for a grill hopper, the apparatus comprising:
   a board having a bottom surface;
   a recessed area formed along the bottom surface, wherein the recessed area is dimensioned to receive a top lid of the grill hopper;
   a recessed distance between the bottom surface and the recessed area, wherein the recessed distance is between one-half to one and one-quarter of an inch;
   one or more attachment element along the recessed area, wherein the one or more attachment element is a magnetizable material, wherein the magnetizable material is a neodymium magnet, wherein the neodymium magnet is countersunk in the recessed area, wherein the recessed area defines an adjacent bottom edge dimensioned to be received between a hopper lid and a grill that a hopper of the hopper lid is operatively associated with; and
   one or more instructional indicia provided along the bottom surface.

2. The apparatus of claim 1, further comprising a peripheral gutter along a top surface.

* * * * *